(12) United States Patent
Cao et al.

(10) Patent No.: US 11,493,600 B2
(45) Date of Patent: Nov. 8, 2022

(54) LIGHT SCANNER

(71) Applicant: Shenzhen Genorivision Technology Co., Ltd., Shenzhen (CN)

(72) Inventors: Peiyan Cao, Shenzhen (CN); Yurun Liu, Shenzhen (CN)

(73) Assignee: SHENZHEN GENORIVISION TECHNOLOGY CO., LTD., Shenzhen (CN)

(*) Notice: Subject to any disclaimer, the term of this patent is extended or adjusted under 35 U.S.C. 154(b) by 376 days.

(21) Appl. No.: 16/857,620

(22) Filed: Apr. 24, 2020

(65) Prior Publication Data

US 2020/0249317 A1 Aug. 6, 2020

Related U.S. Application Data

(63) Continuation of application No. PCT/CN2017/107778, filed on Oct. 26, 2017.

(51) Int. Cl.
| | |
|---|---|
| *G02B 3/06* | (2006.01) |
| *G01S 7/481* | (2006.01) |
| *G02B 26/08* | (2006.01) |
| *G02B 26/10* | (2006.01) |
| *G02B 26/12* | (2006.01) |

(52) U.S. Cl.
CPC ............ *G01S 7/481* (2013.01); *G02B 3/06* (2013.01); *G02B 26/0816* (2013.01); *G02B 26/0875* (2013.01); *G02B 26/101* (2013.01); *G02B 26/12* (2013.01)

(58) Field of Classification Search
CPC ......... G01S 7/481; G01S 7/4816; G02B 3/06; G02B 26/101
See application file for complete search history.

(56) References Cited

U.S. PATENT DOCUMENTS

| | | | |
|---|---|---|---|
| 4,593,967 A | 6/1986 | Haugen | |
| 7,303,132 B2 | 12/2007 | Knowles et al. | |
| 2002/0143506 A1 | 10/2002 | D'Aligny et al. | |
| 2003/0090647 A1 | 5/2003 | Isogai et al. | |
| 2015/0109604 A1 | 4/2015 | Masuda | |

(Continued)

FOREIGN PATENT DOCUMENTS

| | | |
|---|---|---|
| CN | 101762595 A | 6/2010 |
| CN | 103576209 A | 2/2014 |

(Continued)

*Primary Examiner* — Ryan D Howard
(74) *Attorney, Agent, or Firm* — IPRO, PLLC; Qian Gu

(57) ABSTRACT

Disclosed herein is an apparatus suitable for light scanning. The apparatus may comprise a light source, an optical device and a detector. The light source may be configured to generate a scanning light beam that diverges along a first dimension to illuminate a line along the first dimension in a target scene, and may be configured to scan the scanning light beam in a second dimension perpendicular to the first dimension. The optical device may be configured to converge return light waves reflected off of the target scene to generate converged return light waves. The detector may comprise a light receiving component. The light receiving component may be configured to receive the converged return light waves. The detector may be configure to detect the converged return light waves incident on the light receiving component.

24 Claims, 13 Drawing Sheets

(56) References Cited

U.S. PATENT DOCUMENTS

2017/0184450 A1 6/2017 Doylend et al.
2019/0018108 A1* 1/2019 Gao .................... G01S 7/4814

FOREIGN PATENT DOCUMENTS

| CN | 206209099 U | 5/2017 |
|----|-------------|--------|
| DE | 102012112940 A1 | 6/2014 |
| TW | I490444 B | 7/2015 |

* cited by examiner

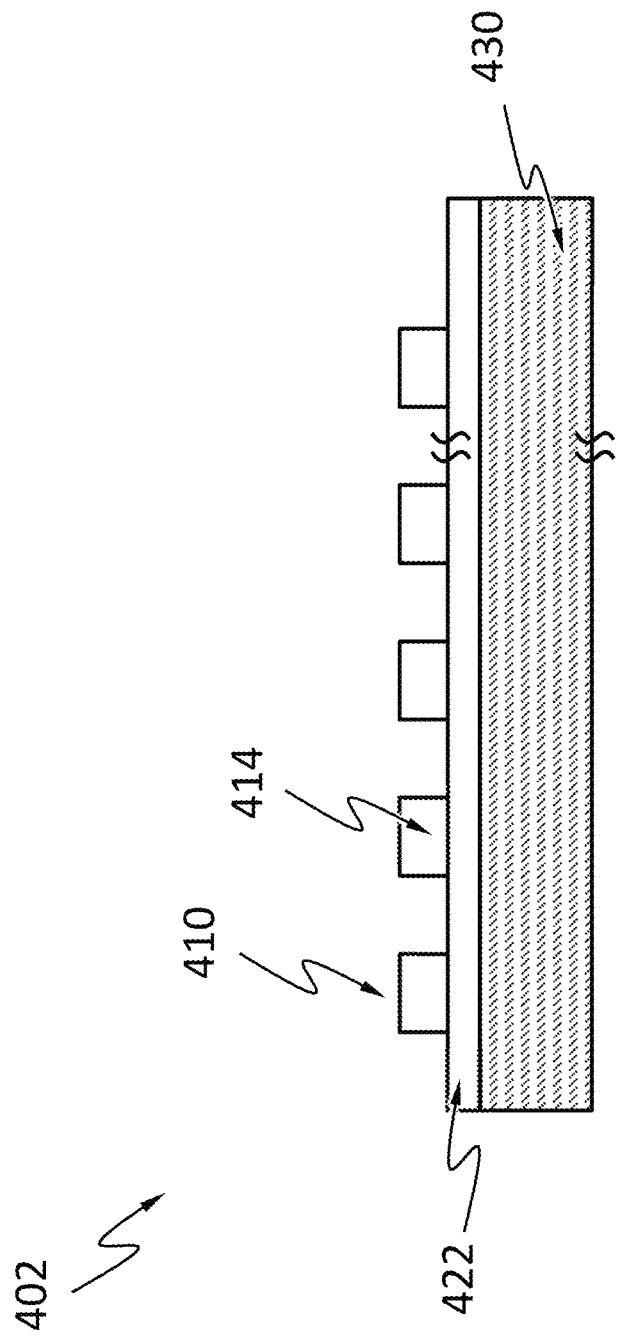

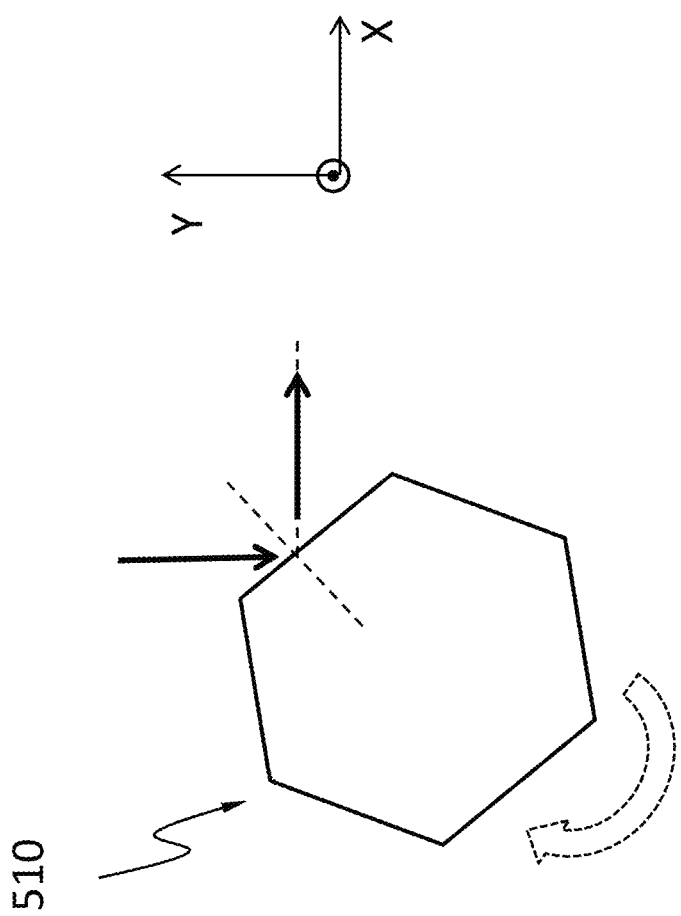

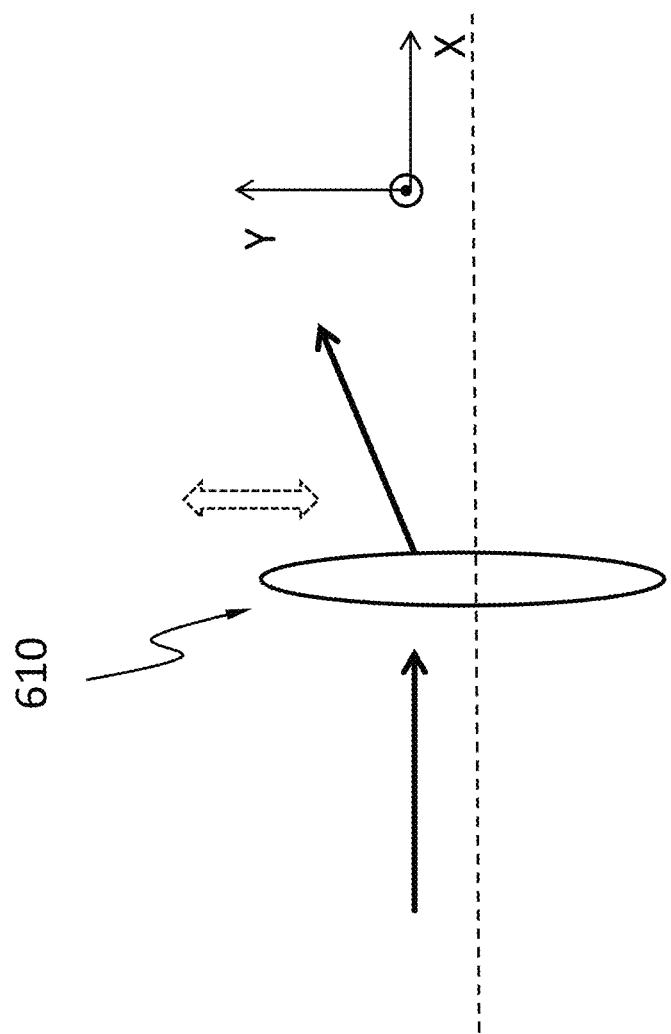

LIGHT SCANNER

TECHNICAL FIELD

The disclosure herein relates to light scanners, particularly relates to a light scanner with steering control of scanning light.

BACKGROUND

Lidar is a laser-based method of detection, range finding and mapping, which uses a technology similar to radar. There are several major components to a lidar system: laser, scanner and optics, photo detectors and receiver electronics. For example, controlled steering of scanning laser beams is carried out, and by processing the captured return signals reflected from distant objects, buildings and landscapes, distances and shapes of these objects, buildings and landscapes may be obtained.

Lidar is widely used. For example, autonomous vehicles (e.g., driverless cars) use lidar (also known as on-vehicle lidar) for obstacle detection and collision avoidance to navigate safely through environments. An on-vehicle lidar is mounted on the roof of a driverless car and it rotates constantly to monitor the current environment around the car. The lidar sensor provides the necessary data for software to determine where potential obstacles exist in the environment, help identify the spatial structure of the obstacle, distinguish objects based on size and estimate the impact of driving over it. One advantage of the lidar systems compared to radar systems is that the lidar systems can provide better range and a large field of view, which helps detecting obstacles on the curves. Despite tremendous progress has been made in developing lidar systems in recent years, a lot of efforts are still being made these days to design lidar systems for various application needs, including developing new light sources that can perform controlled scanning, improving return signal detection.

SUMMARY

Disclosed herein is an apparatus, comprising: a light source configured to generate a scanning light beam that diverges along a first dimension to illuminate a line along the first dimension in a target scene, wherein the light source is configured to scan the scanning light beam in a second dimension perpendicular to the first dimension; an optical device configured to converge return light waves reflected off of the target scene to generate converged return light waves; and a detector comprising a light receiving component, the light receiving component configured to receive the converged return light waves and the detector configured to detect the converged return light waves incident on the light receiving component.

According to an embodiment, the optical device comprises a first cylindrical lens and a second cylindrical lens, wherein the first cylindrical lens is positioned between the target scene and the second cylindrical lens.

According to an embodiment, the first cylindrical lens is configured to converge the return light waves in the second dimension, wherein the second cylindrical lens is configured to converge the return light waves after passing through the first cylindrical lens in the first dimension.

According to an embodiment, each focal length of the first and second cylindrical lenses is positive, wherein the focal length of the first cylindrical lens is shorter than the focal length of the second cylindrical lens.

According to an embodiment, the detector is configured to generate electrical signals based on the returned light waves detected by the detector.

According to an embodiment, the apparatus further comprises a signal-processing unit configured to process and analyze the electrical signals.

According to an embodiment, the light source comprises a light emitter and a light scanning element, wherein the light scanning element is configured to receive an input light beam from the light emitter and generate the scanning light beam, wherein the light scanning element is configured to control the scanning light beam to scan in the second dimension.

According to an embodiment, the light source further comprises an optical component configured to diverge the scanning light beam from the light scanning element in the first dimension.

According to an embodiment, the optical component comprises a one-dimensional diffraction grating.

According to an embodiment, the optical component comprises a cylindrical lens.

According to an embodiment, the light scanning element comprises a plurality of optical waveguides and an electronic control system; wherein the plurality of optical waveguides each comprises an input end, an optical core and an output end, the output ends of the plurality of optical waveguides arranged to line up in the second dimension; wherein the electronic control system configured to adjust dimensions of the optical cores of the plurality of optical waveguides by regulating temperatures of the optical cores of the plurality of optical waveguides; wherein by adjusting the dimensions of the optical cores of the plurality of optical waveguides the electronic control system is configured to control phases of output light waves from the plurality of optical waveguides for the output light waves to form the scanning light beam and control the scanning light beam to scan in the second dimension.

According to an embodiment, at least one optical core comprises an optical medium that is conductive and transparent.

According to an embodiment, the at least one optical core is electronically connected to the electronic control system, wherein the electronic control system is configured to control the temperature of at least one optical core by applying an electric current flowing through the at least one optical core.

According to an embodiment, at least one of the plurality of optical waveguides further comprises a conductive cladding around sidewalls of a respective optical core.

According to an embodiment, the conductive cladding is electronically connected to the electronic control system, wherein the electronic control system is configured to control the temperature of the respective optical core by applying an electric current flowing through the conductive cladding.

According to an embodiment, the light scanning element further comprises a temperature modulation element electrically connected to the electronic control system, where in the electronic control system is configured to control the temperature of at least one optical core by adjusting the temperature of the temperature modulation element.

According to an embodiment, the temperature modulation element and the plurality of optical waveguides are formed on a common substrate.

According to an embodiment, the plurality of optical waveguides is formed on a surface of a common substrate.

According to an embodiment, at least one optical waveguide is curved.

According to an embodiment, at least one of the plurality of optical waveguides is on one substrate and at least another of the plurality of optical waveguides is on a separated substrate.

According to an embodiment, light waves of an input light beam to the plurality of optical waveguides are coherent.

According to an embodiment, the light scanning element is a mirror comprising a plurality of faces, wherein the mirror is configured to let the input light beam from the light emitter reflect off from one of the plurality of faces while the mirror rotates.

According to an embodiment, the light scanning element is a lens configured to let the input light beam from the light emitter pass through while the lens moves back and forth in the second dimension.

According to an embodiment, the light scanning element is a mirror configured to let the input light beam the light emitter reflect off while the mirror rotates back and forth or moves in a third dimension back and forth.

According to an embodiment, the scanning light beam is a laser beam.

Disclosed herein is a system suitable for laser scanning, the system comprising: the apparatus of any one of the apparatuses above, wherein the apparatus is configured to generate a scanning laser beam and scan the target scene, wherein the apparatus is configured to detect return laser signals after the scanning laser beam bounces off of the target scene; wherein the system is a Lidar system.

BRIEF DESCRIPTION OF FIGURES

FIG. 4D schematically shows a cross-sectional view of the light steering component, according to an embodiment.

FIG. 5 schematically shows a light steering component, according to another embodiment.

FIG. 6 schematically shows a light steering component, according to an embodiment.

DETAILED DESCRIPTION

Figure 1:
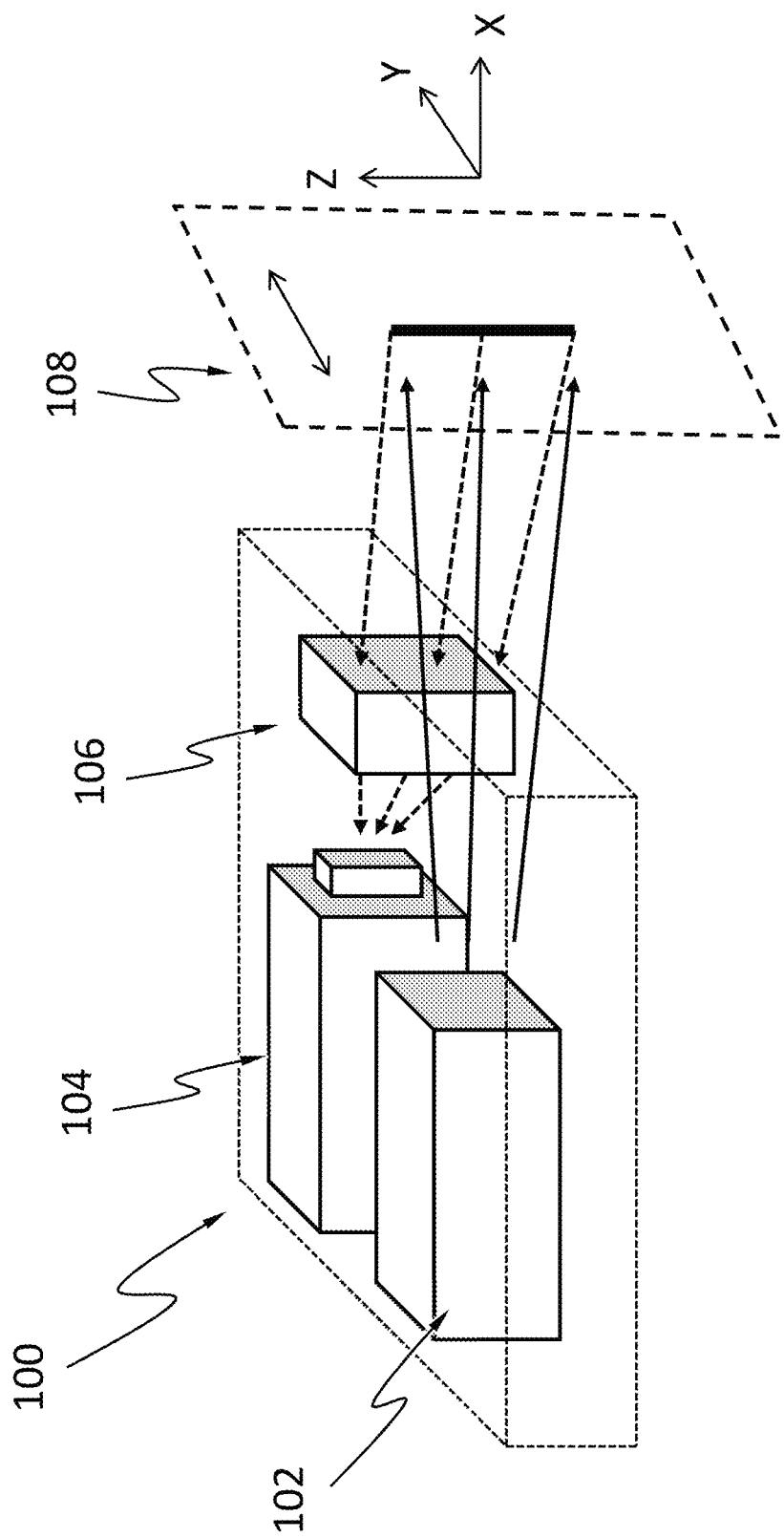
FIG. 1 schematically shows a perspective view of an apparatus suitable for light scanning, according to an embodiment.

FIG. 1 schematically shows a perspective view of an apparatus 100 suitable for light scanning, according to an embodiment. The apparatus 100 may comprise a light source 102, a detector 104 and an optical device 106.

The light source 102 may be configured to generate a scanning light beam that diverges along a first dimension to illuminate a line along the first dimension in a target scene 108. The light source 102 may be further configured to scan the scanning light beam in a second dimension perpendicular to the first dimension. In example of FIG. 1, the scanning light beam of the light source 102 illuminates a line along the Z dimension on the target scene 108, and the light source 102 is configured to steer the scanning light beam in the Y dimension.

The optical device 106 may be configured to converge return light waves reflected off of the target scene 108 to generate converged return light waves. The optical device 106 may be positioned between the detector 104 and the target scene 108.

The detector 104 may comprise a light receiving component. The light receiving component may be configured to receive the converged return light waves, and the detector 104 may be configured to detect the converged return light waves incident on the light receiving component. In one embodiment, the detector 104 may be configured to generate electrical signals based on the converged return light waves detected. The apparatus 100 may further comprise a signal-processing unit configured to process and analyze the electrical signals.

Figure 2A:
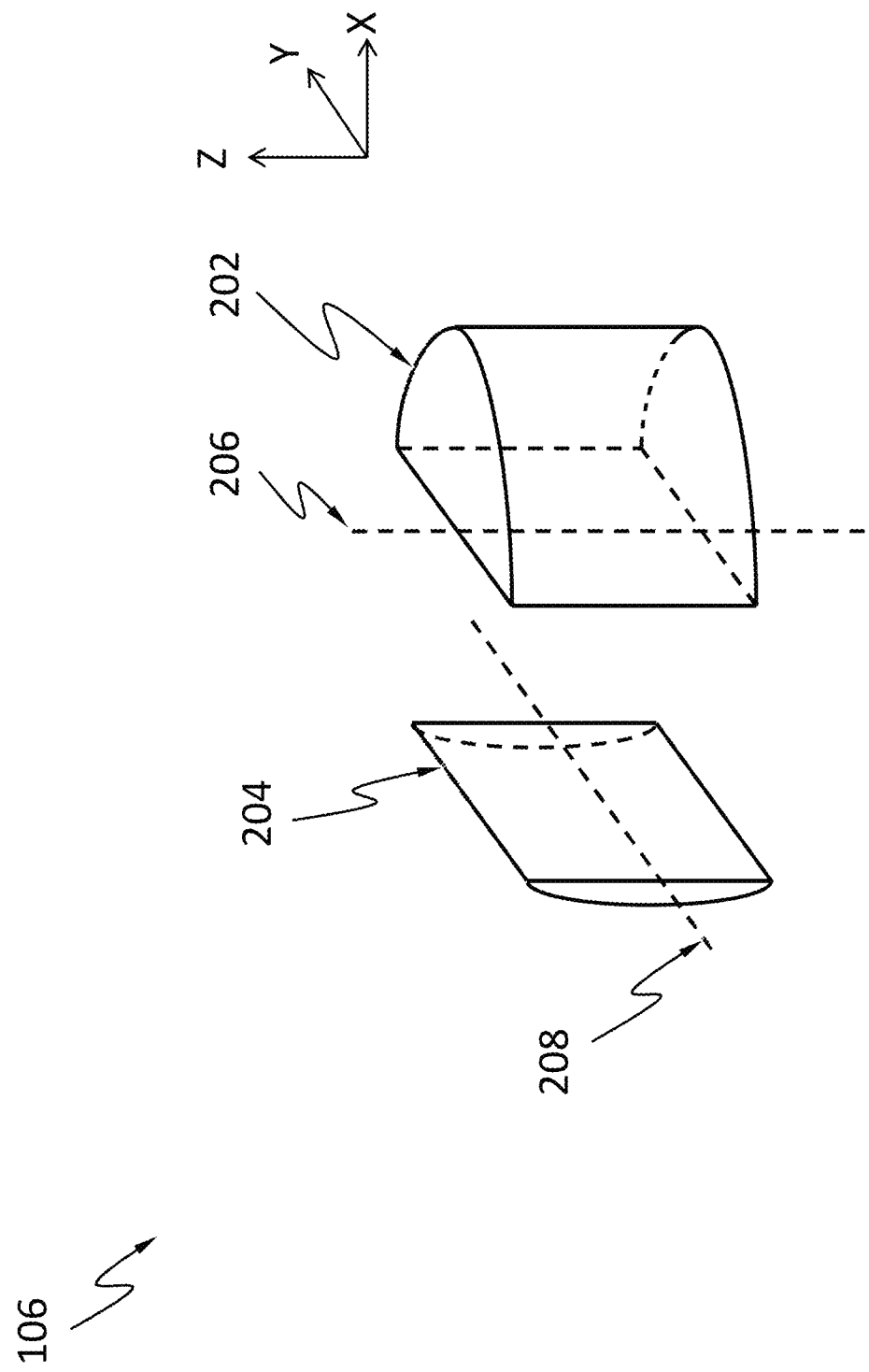
FIG. 2A schematically shows a perspective view of an optical device, according to one embodiment.

FIG. 2A schematically shows a perspective view of the optical device 106, according to one embodiment. The optical device 106 may comprise a first cylindrical lens 202 and a second cylindrical lens 204. The first and second cylindrical lenses 202 and 204 may be separated from each other.

Figure 2B:
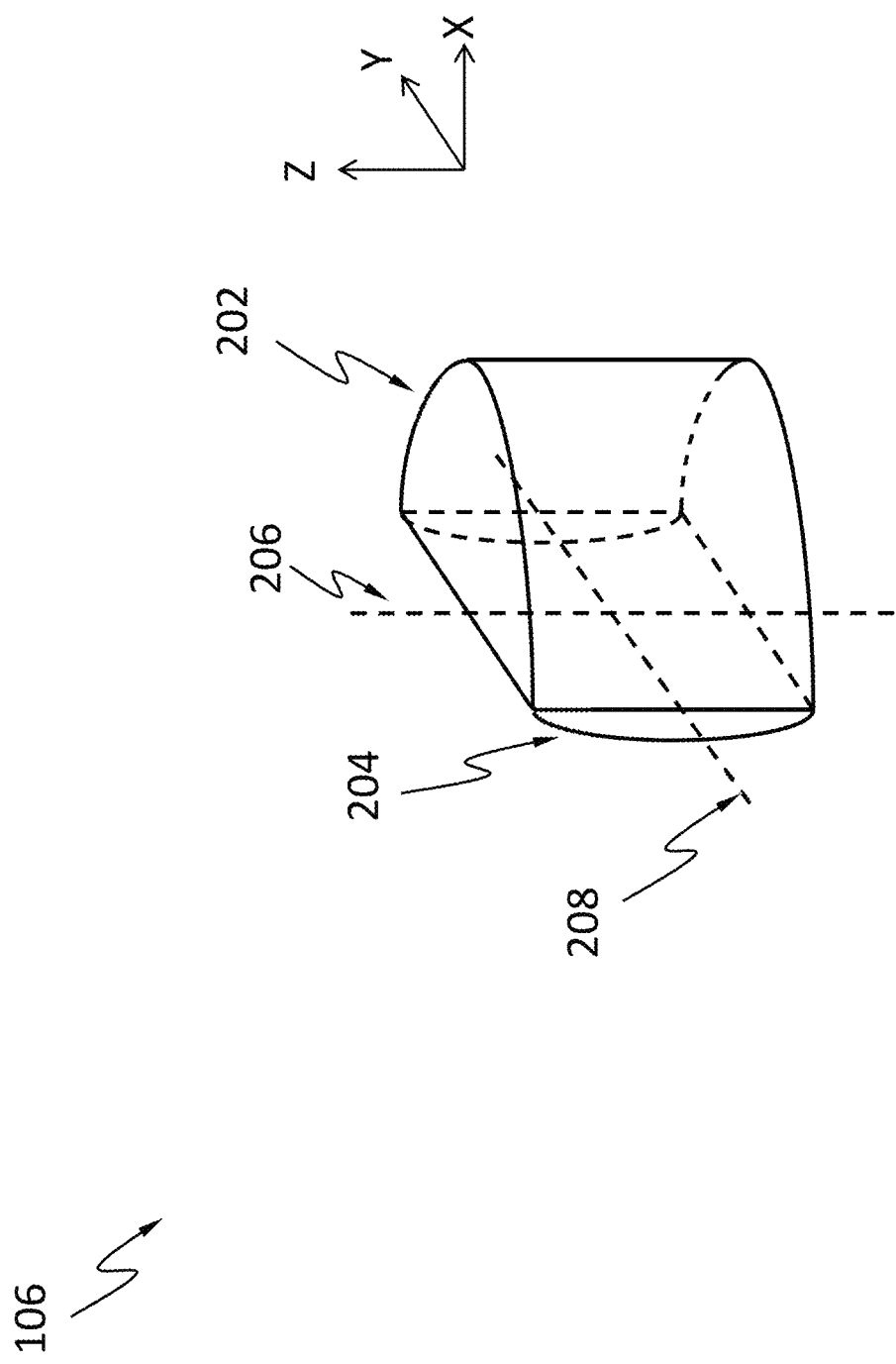
FIG. 2B schematically shows a perspective view of an optical device, according to another embodiment.

FIG. 2B schematically shows a perspective view of the optical device 106 comprising the first and second cylindrical lenses 202 and 204, according to another embodiment. The first and second cylindrical lenses 202 and 204 may be attached to each other. In example of FIG. 2B, the rectangular face of the first cylindrical lenses 202 attaches to the rectangular face of the second cylindrical lenses 204.

In an embodiment, the first cylindrical lens 202 and the second cylindrical lens 204 may be arranged orthogonal to each other, that is, the axial axis of the first cylindrical lens 202 (e.g., dashed line 206 in Z direction in FIGS. 2A and 2B) is perpendicular to the axial axis of the second cylindrical lens 204 (e.g., dashed line 208 in Y direction in FIGS. 2A and 2B). In an embodiment, each focal length of the first and second cylindrical lenses 202 and 204 may be positive. In example of FIG. 2A and FIG. 2B, both the first and second cylindrical lenses 202 and 204 may have a plano-convex configuration. The focal length of the first cylindrical lens 202 may be shorter than the focal length of the second cylindrical lens 204.

A cylindrical lens may be used to focus an incoming light to a line, or to change the aspect ratio of an image. In an embodiment, the first cylindrical lens 202 may be configured to receive the return light waves when the light source 102 steers the scanning light beam in the second dimension, and to converge the return light waves incident thereon in the second dimension. The second cylindrical lens 204 may be configured to further converge the return light waves after passing through the first cylindrical lens 202 in the first dimension.

Figure 2C:
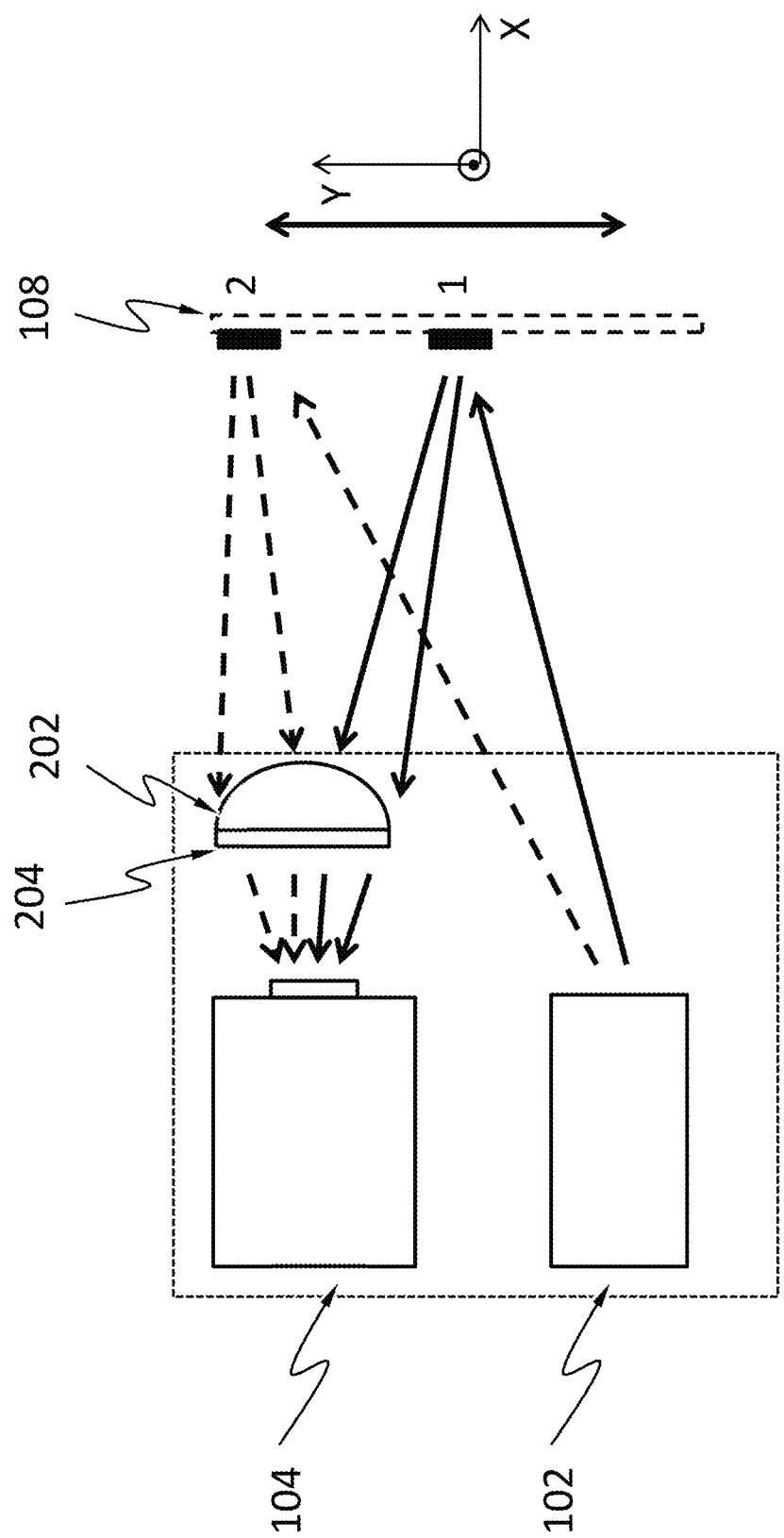
FIG. 2C schematically shows a top view of the apparatus comprising a first cylindrical lens and a second cylindrical lens, according to an embodiment.

FIG. 2C schematically shows a top view of the apparatus 100 comprising the first cylindrical lens 202 and the second cylindrical lens 204, according to an embodiment. The first cylindrical lens 202 may be positioned between the target scene 108 and the second cylindrical lens 204. In example of FIG. 2C, the axial axis of the first cylindrical lens 202 is in the Z direction (e.g., pointing out of the X-Y plane) and the curved face of the first cylindrical lens 202 is facing toward the target scene 108. The axial axis of the second cylindrical lens 204 is in Y direction, and the curved face of the second cylindrical lens 204 is facing toward the detector 104.

When the scanning light beam illuminates a line at a first position (position 1 in FIG. 2C) on the target scene 108, the return light waves from the illuminated line at the first position may hit different locations on the curved face of the first cylindrical lens 202. The first cylindrical lens 202 may converge the return light waves incident thereon in the Y dimension. The second cylindrical lens 204 may further converge the returned light waves in the Z dimension so that the converged return light waves are within the detection range of the detector 104 and received by the light detecting elements of the detector 104.

When the light source 102 steers the scanning light beam in the Y dimension and the illuminated line on the target scene 108 moves up from the first position to a second position (position 2 in FIG. 2C), the return light waves from the illuminated line at the second position may hit the curved face of the first cylindrical lens 202 at locations different from the return light waves from the illuminated line at the first position. The first cylindrical lens 202 may also converge the return light waves from the illuminated line at the second position incident thereon in the Y dimension. The second cylindrical lens 204 may further converge the returned light waves in the Z dimension so that the converged return light waves from the illuminated line at the second position are also within the detection range of the detector 104 and received by the light detecting elements of the detector 104.

Figure 3:
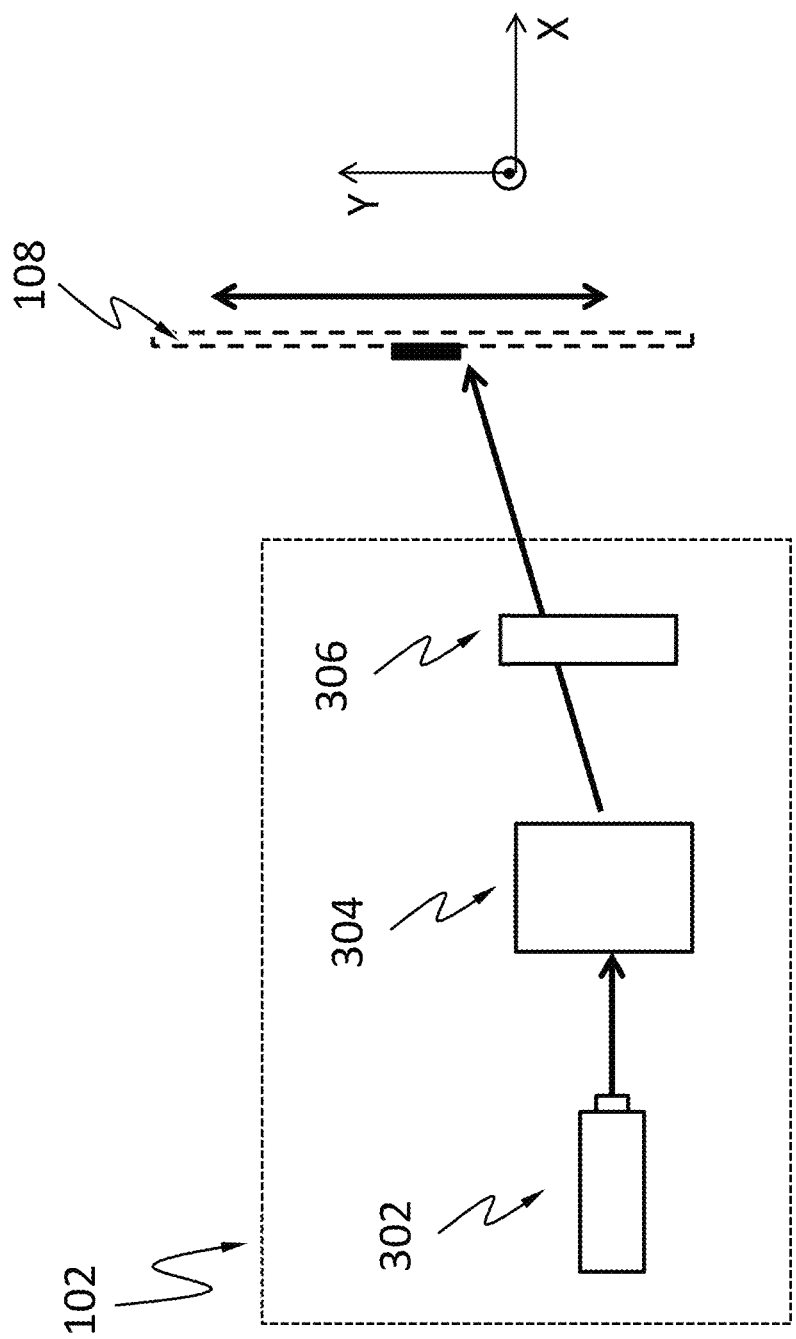
FIG. 3 schematically shows a light source, according to an embodiment.

FIG. 3 schematically shows the light source 102, according to an embodiment. The light source 102 may comprise a light emitter 302, a light steering component 304 and an optical component 306. In an embodiment, the light emitter 302 may be a laser source. The light steering component 304 may be configured to receive an input light beam from the light emitter 302, generate a scanning light beam and steer the scanning light beam in the second dimension. The optical component 306 may be configured to diverge the scanning light beam from the light steering component 304 in the first dimension so that the scanning light beam illuminates a line along the first dimension in the target scene 108. As shown in FIG. 3, the optical component 306 may be positioned between the light steering component 304 and the target scene 108. In another embodiment, the light steering component 304 may be positioned between the optical component 306 and the target scene 108. In an embodiment, the optical component 306 may comprise a one-dimensional diffraction grating or a cylindrical lens.

Figure 4A:
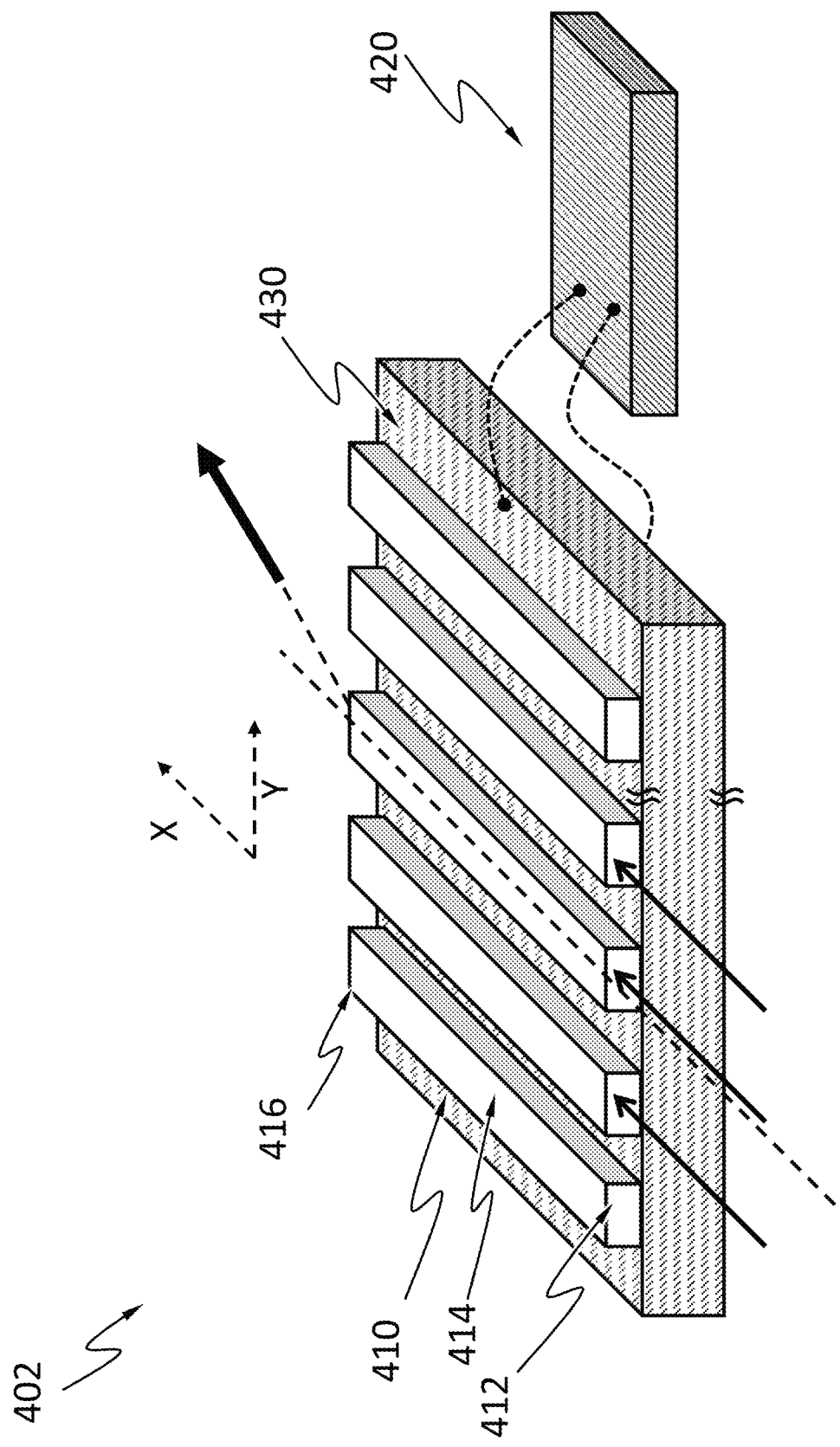
FIG. 4A schematically shows a perspective view of a light steering component, according to one embodiment.

FIG. 4A schematically shows a perspective view of the light steering component 402, according to one embodiment. The light steering component 402 may be an embodiment of the light steering component 304 and may comprise a plurality of optical waveguides 410 and an electronic control system 420. In one embodiment, the plurality of optical waveguides 410 may lie on a surface of a substrate 430. The plurality of optical waveguides 410 may be controlled by the electronic control system 420 to generate a scanning light beam and steer the scanning light beam in the second dimension.

Each of the optical waveguides 410 may comprise an input end 412, an optical core 414 and an output end 416. The optical core 414 may comprise an optical medium. In one embodiment, the optical medium may be transparent. The input ends 412 of the optical waveguides 410 may receive input light waves and the received light waves may pass through the optical cores 414 and exit as output light waves from the output ends 416 of the optical waveguides 410. Diffraction may cause the output light waves from each of the optical cores 414 to spread over a wide angle so that when the input light waves are coherent (e.g., from a coherent light source such as a laser), the output light waves from the plurality of optical waveguides 410 may interfere with each other and exhibit an interference pattern. In one embodiment, the output ends 416 of the plurality of optical waveguides 410 may be arranged to line up in the second dimension. For example, as shown in FIG. 4A, the output ends 416 of the plurality of optical waveguides 410 may be lined up in Y dimension. This way, the output interfaces may face the X direction.

The electronic control system 420 may be configured to control phases of the output light waves from the plurality of optical waveguides 410 for the interference pattern to generate a scanning light beam and steer the scanning light beam in the second dimension. Dimensions of each of the optical cores 414 may be individually adjusted by the electronic control system 420 to control phases of output light waves from respective optical cores 414. The electronic control system 420 may be configured to individually adjust the dimensions of each of the optical cores 414 by regulating the temperature of each of the optical cores 414 respectively.

In an embodiment, the light waves of the input light beam to the plurality of optical waveguides 410 may be at a same phase. The interference pattern of the output light waves from the plurality of optical waveguides 410 may comprise one or more propagating bright spots where output light waves constructively interfere (e.g., re-enforce) and one or more propagating weak spots where output light waves destructively interfere (e.g., cancel out each other). In an embodiment, the one or more propagating bright spots may form one or more scanning light beams. If the phases of the output light beams of the optical cores 414 shift and the phase differences change, the constructive interferences may happen at different directions so that the interference pattern of the output light waves (e.g., the directions of the one or more scanning light beams generated) may also change. In other words, light beam steering in the second dimension may be realized by adjusting the phases of the output light beams from the plurality of optical waveguides 410.

One way of adjusting the phases of the output light waves is changing the effective optical paths of the light waves propagated through the optical cores 414. An effective optical path of a light wave propagated through an optical medium may depend on the physical distance the light travels in the optical medium (e.g., depending on incident angle of the light wave, dimensions of the optical medium). As a result, the electronic control system 420 may adjust the dimensions of the optical cores 414 to change the effective optical paths of incident light beam propagates through the optical cores 414 so that the phases of the output light waves may shift under the control of the electronic control system 420. For example, the length of each of the optical cores 414 may change because at least a part of the respective optical cores 414 has a temperature change. Moreover, the diameter of at least a section of an optical core 414 may change if at least part of the section of the optical core 414 has a temperature change. Therefore, in one embodiment, regulating the temperature of each of the optical cores 414 may be used to control the dimensions of the optical cores 414 (e.g., due to the thermal expansion or contractions of the optical cores 414).

It should be noted that although FIG. 4A shows the plurality of optical waveguides 410 are arranged in parallel, this is not required in all embodiments. In some embodiments, the output ends 416 may be lined up in a dimension but the plurality of optical waveguides 410 need not be straight or be arranged in parallel. For example, in one embodiment, at least one of the optical waveguide 410 may be curved (e.g., "U" shaped, "S" shaped, etc.). The cross-sectional shape of the optical waveguides 410 may be a rectangle, circle, or any other suitable shape. In an embodiment, the plurality of optical waveguides 410 may form a one-dimensional array placed on a surface of the substrate 430 as shown in FIG. 4A. The optical waveguides 410 need not to be evenly distributed in the one-dimensional array. In other embodiments, the plurality of optical waveguides 410 needs not to be on one substrate. For example, some optical waveguides 410 may be on one substrate, some other optical waveguides 410 may be on a separate substrate.

The substrate 430 may include conductive, non-conductive or semiconductor materials. In an embodiment, the substrate 430 may include a material such as silicon dioxide. In an embodiment, the electronic control system 420 may be embedded in the substrate 430 but also may be placed outside of the substrate 430.

In an embodiment, the light source 102 may further comprise a beam expander (e.g., a group of lenses). The beam expander may expand the input light beam before the input light beam enters the plurality of optical waveguides 410. The expanded input light beam may be collimated. In an embodiment, the light source 102 may further comprise a one-dimensional diffraction grating (e.g., a cylindrical microlens array) configured to converge and couple the light waves of the input light beam into the plurality of optical waveguides 410.

Figure 4B:
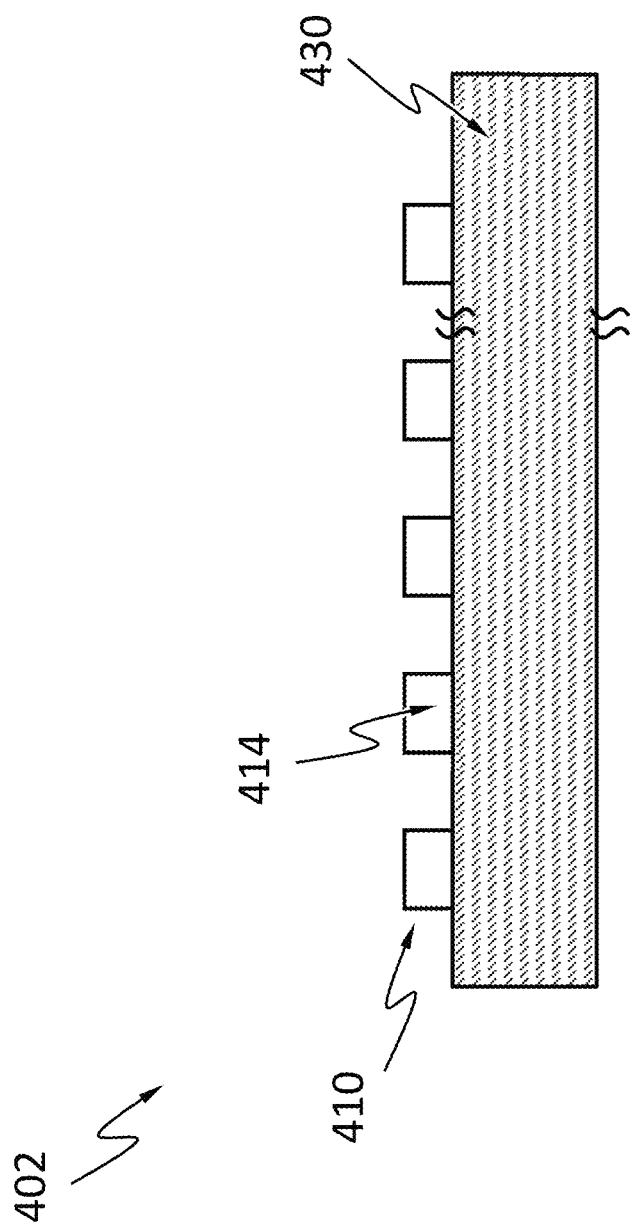
FIG. 4B schematically shows a cross-sectional view of the light steering component, according to one embodiment.

FIG. 4B schematically shows a cross-sectional view of the light steering component 402 of FIG. 4A, according to one embodiment. Each of the optical cores 414 may comprise an optical medium that is conductive and transparent. The optical cores 414 may be electrically connected to the electronic control system 420. In an embodiment, the electronic control system 420 may be configured to individually adjust the dimensions of each of the optical cores 414 by individually regulating the temperature of each of the optical cores 414. The electronic control system 420 may apply an electric current to each of the optical cores 414 respectively. The temperature of each of the optical cores 414 may be individually regulated by controlling the magnitude of the electric current flowing through each of the optical cores 414.

Figure 4C:
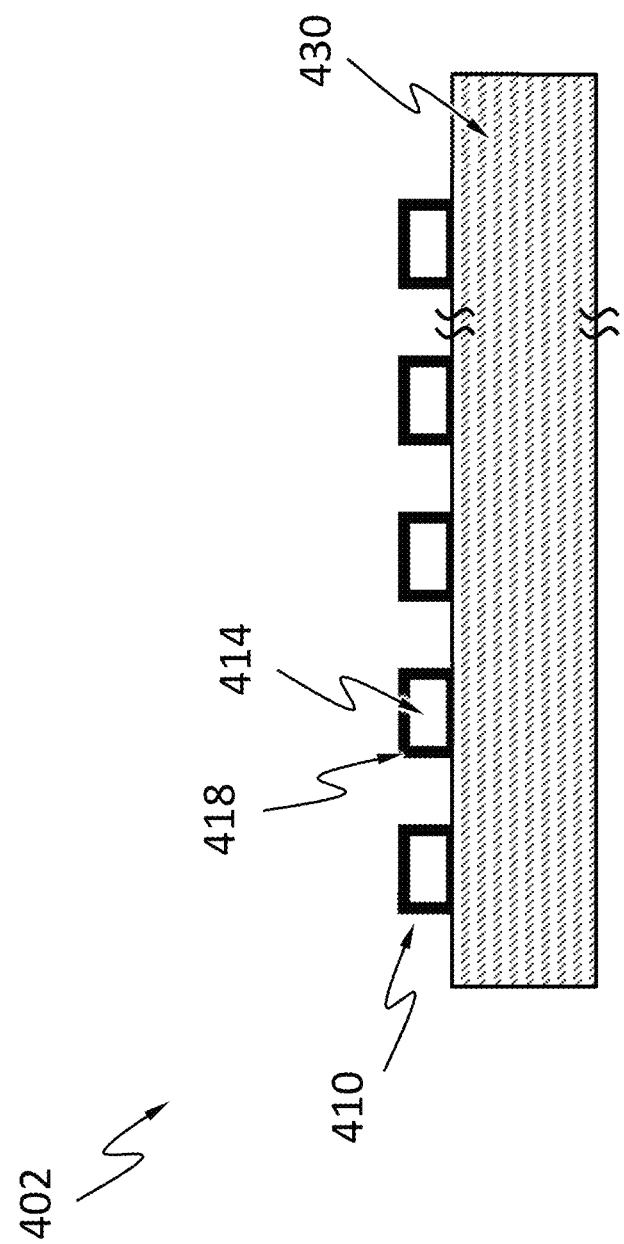
FIG. 4C schematically shows a cross-sectional view of the light steering component, according to another embodiment.

FIG. 4C schematically shows a cross-sectional view of the light steering component 402 of FIG. 4A, according to another embodiment. Each of the optical waveguides 410 may comprise a conductive cladding 418 around sidewalls of a respective optical core 414. In an embodiment, each of the conductive claddings 418 may be electronically connected to the electronic control system 420. The electronic control system 420 may be configured to individually adjust the dimensions of each of the optical cores 414 by regulating the temperature of each of the optical cores 414. The electronic control system 420 may apply an electric current to each of the conductive cladding 418. The temperature of each of the optical cores 414 may be regulated individually by controlling the magnitude of each of the electric current flowing through each of the respective conductive cladding 418 due to heat transfer between the optical core 414 and the respective conductive cladding 418.

FIG. 4D schematically shows a cross-sectional view of the light steering component 402 of FIG. 4A, according to an embodiment. The light steering component 402 may comprise one or more temperature modulation elements. A temperature modulation element may convert a voltage or current input into a temperature difference that may be used for either heating or cooling. For example, a temperature modulation element may be a Peltier device. The one or more temperature modulation elements may be able to transfer heat to the plurality of optical waveguides 410. In an embodiment, the one or more temperature modulation elements may be in contact with the plurality of optical waveguides 410. In an embodiment, the one or more temperature modulation elements are electronically connected to the electronic control system 420. The electronic control system 420 may be configured to control the temperature of at least one optical core 414 by adjusting the temperature of the one or more temperature modulation elements due to heat transfer between the plurality of optical waveguides 410 and the one or more temperature modulation elements. In one embodiment, the one or more temperature modulation elements may share a common substrate with the plurality of optical waveguides 410. In example of FIG. 4D, the light steering component 402 comprises a layer 422 comprising the one or more temperature modulation elements on a surface of the substrate 430, and the layer 422 is in contact with the plurality of optical waveguides 410.

FIG. 5 schematically shows a light steering component. The light steering component may be another embodiment of the light steering component 304 and may be a mirror 510 comprising a plurality of faces. The mirror 510 may be configured to change the direction of the light beam from the light emitter 302 to scan the light beam in the second dimension. In an embodiment, the mirror 510 may be a hexagonal mirror. The mirror 510 may be driven by an electrical or mechanical drive unit to rotate. The light beam from the light emitter 302 hits on one of the plurality of faces and reflects off from the face incident thereon. The angle of incidence between the incident light beam and the normal of the face incident thereon changes while the mirror 510 rotates so that the angle of reflection changes accordingly and the reflected light beam scans in the second dimension. In example of FIG. 5, rotating the mirror 510 allows the reflected light beam scan in the Y dimension. In an embodiment, the electrical or mechanical drive unit may be electronically connected to and be controlled by the electronic control system 420 so that the rotational speed of the mirror 510 can be adjusted to control the scanning speed of the light beam in the second dimension.

FIG. 6 schematically shows a light steering component. The light steering component may be another embodiment of the light steering component 304 and may be a lens 610. The lens 610 may be controlled by an electrical or mechanical drive unit and able to move back and forth in the second dimension (e.g., up and down in Y dimension). The light beam from the light emitter 302 may pass through the lens 610 and get refracted. The direction of the light beam after passing through the lens 610 changes while the lens moves back and forth in the second dimension. As a result, the light beam after passing through the lens 610 scans in the second dimension. In example of FIG. 6, moving the lens 610 up and down along the Y dimension allows the light beam scan in the Y dimension. In an embodiment, the electrical or mechanical drive unit may be electronically connected to and controlled by the electronic control system 420 so that the moving speed of the lens 610 can be adjusted to control the scanning speed of the light beam in the second dimension.

Figure 7:
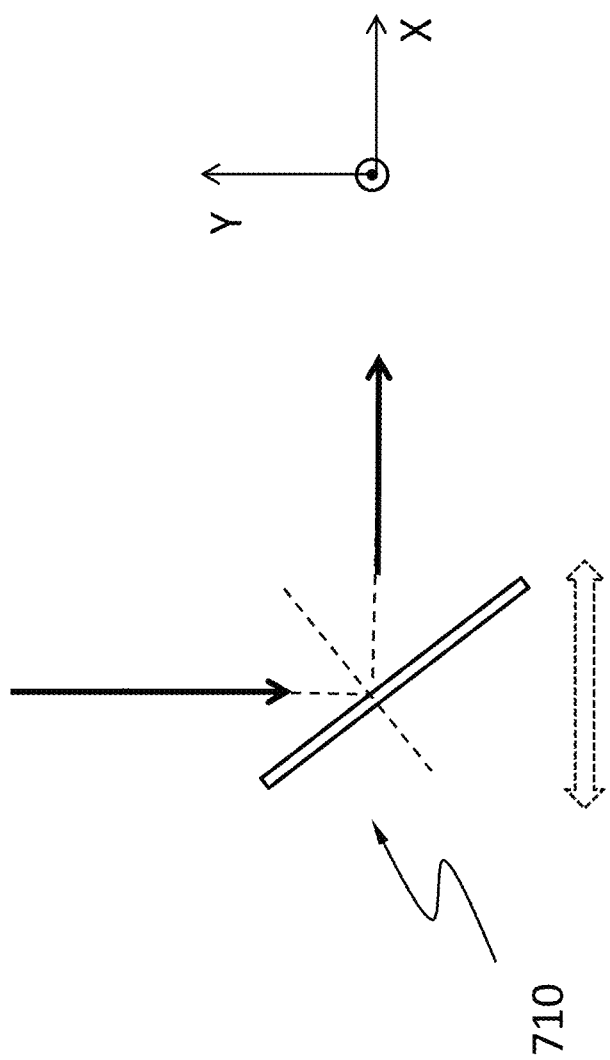
FIG. 7 schematically shows a light steering component, according an embodiment.

FIG. 7 schematically shows a light steering component. The light steering component may be another embodiment of the light steering component 304 and may be a plane mirror 710 or a curved mirror 710. The mirror 710 may be controlled by an electrical or mechanical drive unit and able to move back and forth in a dimension (e.g., in X or Y dimension) or rotate. The light beam from the light emitter 302 may hit on and reflect off from the mirror 710. If the mirror 710 rotates, the angle of incidence between the incident light beam and the normal of the mirror 710 incident thereon changes while the mirror 710 rotates so that the angle of reflection changes accordingly and the reflected light beam scans in the second dimension (e.g., in Y dimension). If the mirror 710 move back and forth in X or Y dimension, the point of incidence for the light beam changes back and forth in Y dimension so that the reflected scanning light beam scans in Y dimension. In example of FIG. 7, moving the mirror 710 back and forth in the X dimension allows the light beam scan in the Y dimension. In one embodiment, the electrical or mechanical drive unit may be electronically connected to and be controlled by the electronic control system 420 so that the rotational or moving speed of the mirror 710 can be adjusted to control the scanning speed of the scanning light beam in the second dimension.

Figure 8:
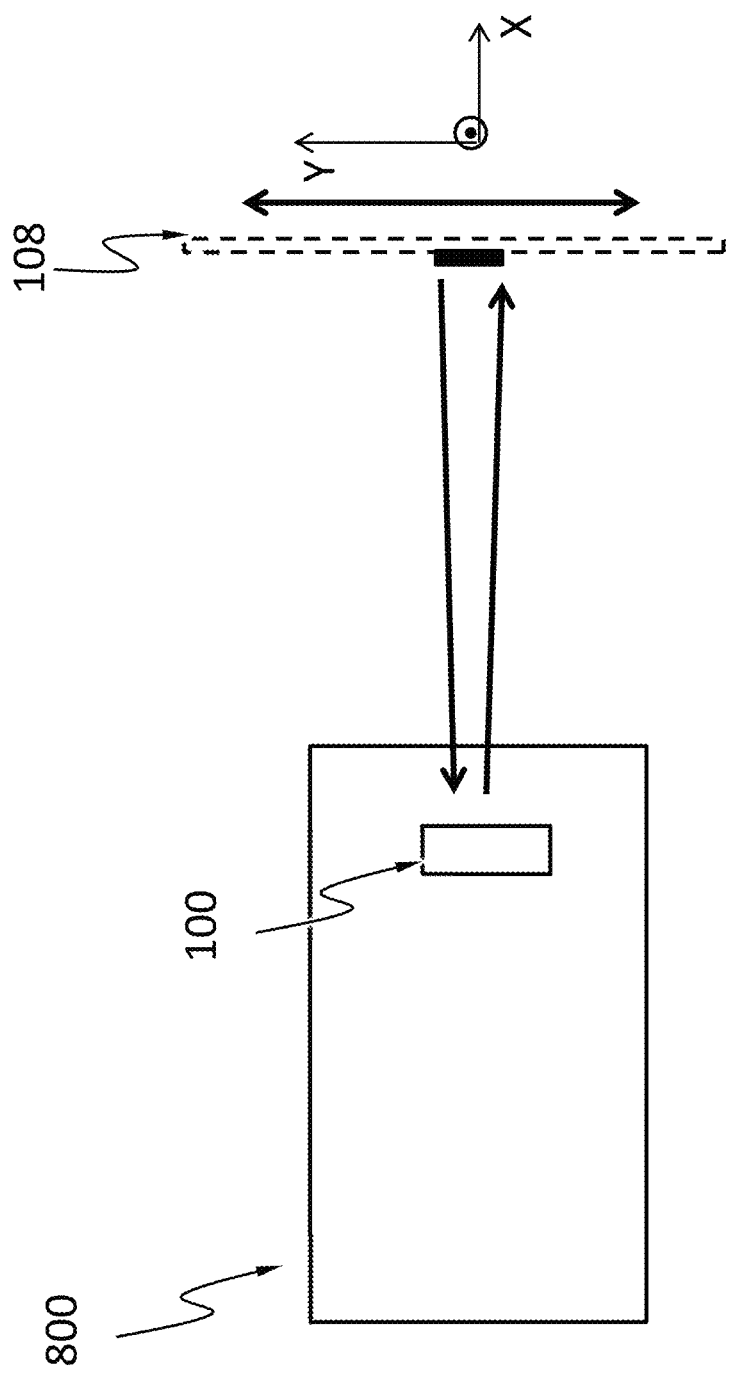
FIG. 8 schematically shows a lidar system, according to an embodiment.

FIG. 8 schematically shows a system 800 comprising the apparatus 100 described herein, according to an embodiment. The system 800 may be a Lidar system. For example, the system 800 may be mounted on a vehicle and used as an on-vehicle Lidar. The apparatus 100 may be configured to generate a scanning laser beam and detect return laser signals after the scanning laser beam bounces off of an object, building or landscape in the target scene 108. In one embodiment, the distance and shape of the object, building or landscape may be obtained.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus, comprising:
   a light source configured to generate a scanning light beam that diverges along a first dimension to illuminate a line along the first dimension in a target scene, wherein the light source is configured to scan the scanning light beam in a second dimension perpendicular to the first dimension;
   an optical device configured to converge return light waves reflected off the target scene to generate converged return light waves; and
   a detector comprising a light receiving component, the light receiving component configured to receive the converged return light waves and the detector configured to detect the converged return light waves incident on the light receiving component;
   wherein the optical device comprises a first cylindrical lens and a second cylindrical lens, wherein the first cylindrical lens is positioned between the target scene and the second cylindrical lens;
   wherein the first cylindrical lens is configured to converge the return light waves in the second dimension, wherein the second cylindrical lens is configured to converge the return light waves after passing through the first cylindrical lens in the first dimension.

2. The apparatus of claim 1, wherein each focal length of the first and second cylindrical lenses is positive, wherein the focal length of the first cylindrical lens is shorter than the focal length of the second cylindrical lens.

3. The apparatus of claim 1, wherein the detector is configured to generate electrical signals based on the returned light waves detected by the detector.

4. The apparatus of claim 3, further comprising a signal-processing unit configured to process and analyze the electrical signals.

5. The apparatus of claim 1, wherein the light source comprises a light emitter and a light scanning element, wherein the light scanning element is configured to receive an input light beam from the light emitter and generate the scanning light beam, wherein the light scanning element is configured to control the scanning light beam to scan in the second dimension.

6. The apparatus of claim 5, wherein the light source further comprises an optical component configured to diverge the scanning light beam from the light scanning element in the first dimension.

7. The apparatus of claim 6, wherein the optical component comprises a one-dimensional diffraction grating.

8. The apparatus of claim 6, wherein the optical component comprises a cylindrical lens.

9. The apparatus of claim 5, wherein the light scanning element comprises a plurality of optical waveguides and an electronic control system;
   wherein the plurality of optical waveguides each comprises an input end, an optical core and an output end, the output ends of the plurality of optical waveguides arranged to line up in the second dimension;
   wherein the electronic control system configured to adjust dimensions of the optical cores of the plurality of optical waveguides by regulating temperatures of the optical cores of the plurality of optical waveguides;
   wherein by adjusting the dimensions of the optical cores of the plurality of optical waveguides the electronic control system is configured to control phases of output light waves from the plurality of optical waveguides for the output light waves to form the scanning light beam and control the scanning light beam to scan in the second dimension.

10. The apparatus of claim 9, wherein at least one optical core comprises an optical medium that is conductive and transparent.

11. The apparatus of claim 10, wherein the at least one optical core is electronically connected to the electronic control system, wherein the electronic control system is configured to control the temperature of at least one optical core by applying an electric current flowing through the at least one optical core.

12. The apparatus of claim 9, wherein at least one of the plurality of optical waveguides further comprises a conductive cladding around sidewalls of a respective optical core.

13. The apparatus of claim 12, wherein the conductive cladding is electronically connected to the electronic control system, wherein the electronic control system is configured to control the temperature of the respective optical core by applying an electric current flowing through the conductive cladding.

14. The apparatus of claim 9, wherein the light scanning element further comprises a temperature modulation element electrically connected to the electronic control system, where in the electronic control system is configured to control the temperature of at least one optical core by adjusting the temperature of the temperature modulation element.

15. The apparatus of claim 14, wherein the temperature modulation element and the plurality of optical waveguides are formed on a common substrate.

16. The apparatus of claim 9, wherein the plurality of optical waveguides is formed on a surface of a common substrate.

17. The apparatus of claim 9, wherein at least one optical waveguide is curved.

18. The apparatus of claim 9, wherein at least one of the plurality of optical waveguides is on one substrate and at least another of the plurality of optical waveguides is on a separated substrate.

19. The apparatus of claim 9, wherein light waves of an input light beam to the plurality of optical waveguides are coherent.

20. The apparatus of claim 5, wherein the light scanning element is a mirror comprising a plurality of faces, wherein the mirror is configured to let the input light beam from the light emitter reflect off from one of the plurality of faces while the mirror rotates.

21. The apparatus of claim 5, wherein the light scanning element is a lens configured to let the input light beam from the light emitter pass through while the lens moves back and forth in the second dimension.

22. The apparatus of claim 5, wherein the light scanning element is a mirror configured to let the input light beam the light emitter reflect off while the mirror rotates back and forth or moves in a third dimension back and forth.

23. The apparatus of claim 1, wherein the scanning light beam is a laser beam.

24. A system suitable for laser scanning, the system comprising:

the apparatus of claim 1, wherein the apparatus is configured to generate a scanning laser beam and scan the target scene, wherein the apparatus is configured to detect return laser signals after the scanning laser beam bounces off of the target scene;

wherein the system is a Lidar system.

* * * * *